United States Patent [19]

Golabek

[11] 4,322,966

[45] Apr. 6, 1982

[54] WEAPON CYCLE OR SHOT COUNTER

[75] Inventor: Robert S. Golabek, Montville, N.J.

[73] Assignee: The United States of America as represented by the Secretary of the Army, Washington, D.C.

[21] Appl. No.: 267,143

[22] Filed: May 26, 1981

[51] Int. Cl.$^3$ ........................ G01D 21/00; G06M 1/00

[52] U.S. Cl. .......................................... 73/7; 235/103; 116/208

[58] Field of Search ......... 235/103, 103.5 R, 103.5 E, 235/105, 107; 73/7; 116/208; 346/38

[56] References Cited

U.S. PATENT DOCUMENTS

| | | | |
|---|---|---|---|
| 3,289,458 | 12/1966 | Deichert et al. | 73/7 |
| 3,298,466 | 1/1967 | Ayers, Jr. et al. | 116/208 X |
| 3,533,491 | 10/1970 | Svenson | 116/208 X |

*Primary Examiner*—L. T. Hix
*Assistant Examiner*—Benjamin R. Fuller
*Attorney, Agent, or Firm*—Nathan Edelberg; Robert P. Gibson; Harold H. Card, Jr.

[57] ABSTRACT

A round-counter for heavy artillery guns comprises a small block secured between stationary and recoiling gun parts. A surface of a recoiling part makes frictional surface contact with the stationary block so that erosion of the block through frictional wear is equitable to number of rounds fired. The device can also be used to count revolutions of a journaled shaft or the like.

7 Claims, 5 Drawing Figures

WEAPON CYCLE OR SHOT COUNTER

The invention described herein may be manufactured, used and licensed by or for the Government for governmental purposes without the payment to me of any royalties thereon.

BACKGROUND OF THE INVENTION

1. Field of the Invention

This invention relates to a cycle counter for use with a sliding or rotary movement device and more particularly, counts the total number of rotations or reciprocations of a device.

2. Brief Description of the Prior Art

In connection with numerous devices, such as weapons, engines and the like, it is highly desirable to maintain a running account of the number of cycles to which the system has been subjected in order to provide an orderly replacement of known wear items. Conventional wear counters are bulky, employ numerous parts and in some cases require external power for their operation. Their bulk and requirements are inconsistent with certain applications of use, particularly where there are space limitations. Mechanical and electrical counters are typically complicated devices having numerous parts while chemical counters require external current to perform their functions. Many of these types cannot withstand high shock stress of the type associated with heavy artillery guns. Also, where special tools or precision equipment is needed to read the counter, such sophisticated items are not usually available to military troops in combat.

SUMMARY OF THE INVENTION

The instant invention relates to a cycle counter device for counting the number of repetitive movements between two mechanical elements. A wear member is equipped with a spring bias device to force it toward a designated element, the wear member and spring device being placed in a recess or other receiving means in the opposite element. The wear member is formed of a material of substantially higher wear rate than the other elements, therefore wearing faster and correlating the wear rate of the member with the number of repetitive movements of the two elements to each other.

BRIEF DESCRIPTION OF THE DRAWINGS

The objects and advantages of the invention will become apparent from the following description of the invention, particularly when read in conjunction with the drawings, wherein like numbers represent like parts and wherein.

DESCRIPTION OF THE PREFERRED EMBODIMENTS

Figure 1:
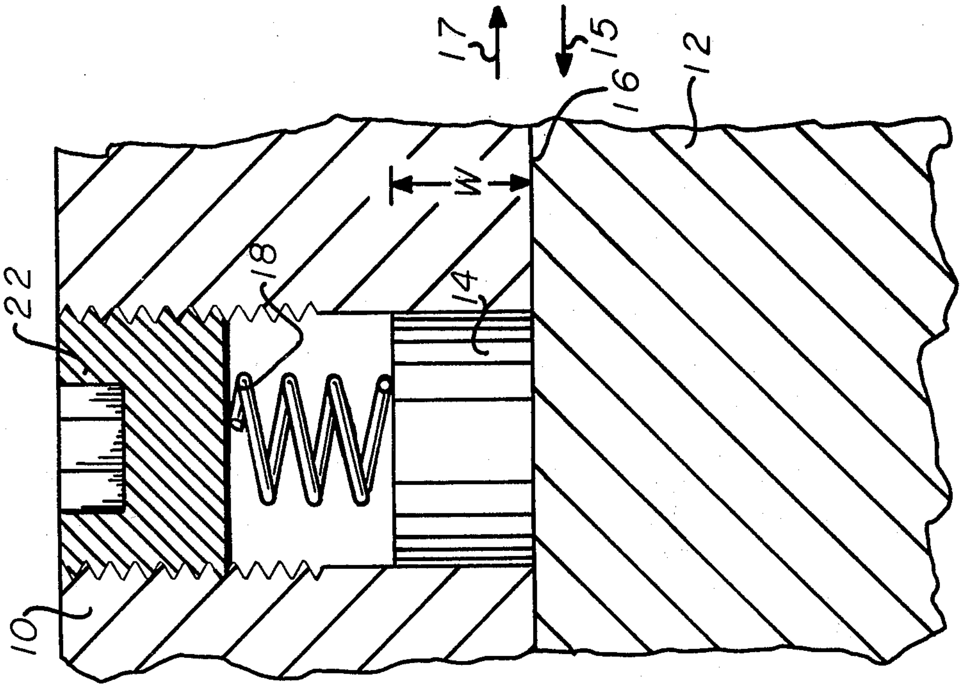
FIG. 1 is a fragmentary elevational view partly in cross-section of a wear counter in accordance with the present invention.

The device of FIG. 1 is used to count the extent of movement of a first mechanism 10 relative to a second mechanism 12. The movement can be a sliding action or reciprocating motion such as characteristic of recoiling parts in a howitzer or other combat gun, or a piston in an engine block or a rotary motion such as in a Wankel engine. In a rotary motion system, the extent of surface wear can usually be correlated with the number of revolutions in relation to the radial distance of such surface from the rotation axis.

In FIG. 1, stationary wear block 14 is forced or biased toward moving surface 16 of a translationally movable element 12 by helical spring 18. The achievement of a substantially uniform force rate in spring 18 is desirable since variations in the force with which the spring 18 biases wear block 14 against surface 16 will influence the wear rate of the block. Although the calibration of cycles vs. decreased length of the wear block can compensate for a non-linear wear progression, a uniform wear rate is preferred. In any event, wear member 12 should be adapted to erode at a predictable rate correlatable with the number of repetitive movements of surface 16 relative to stationary element 10. The spring 18 and the wear block 14 can be removed from their in-use position by the threaded retaining screw 22 which can be of any convenient design.

Figure 3:
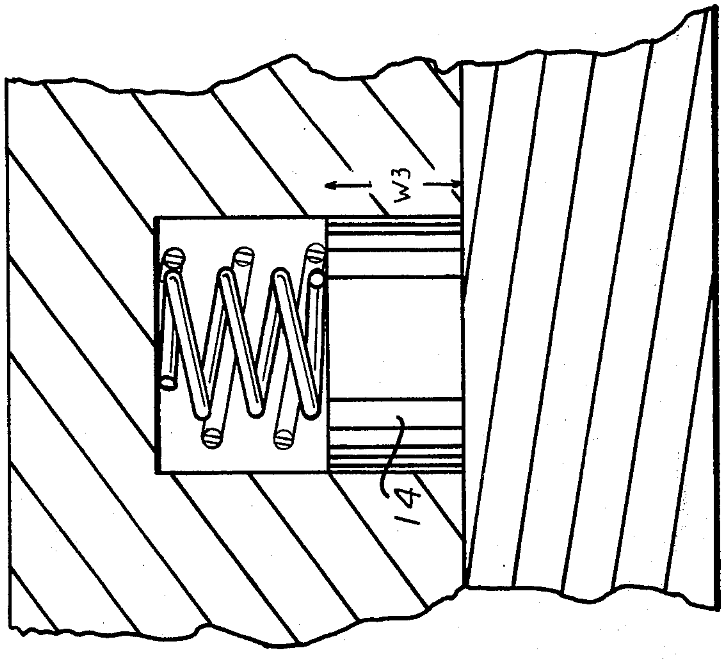
FIG. 3 is a view corresponding to FIG. 1 showing embodiment of the present invention.

In the modification of FIG. 3, a complementary spring 30 is used in association with the primary spring 18 in order to achieve a more uniform spring constant over the entire compression range of the two springs. The use of plural springs is helpful in achieving uniformly graduated markings or linear calibration of the wear block. Generally, adequately constant K values for compression springs for the length of travel involved in a counter can be achieved with commercially available springs. The K value is spring displaced length divided by compressive force.

Figure 4:
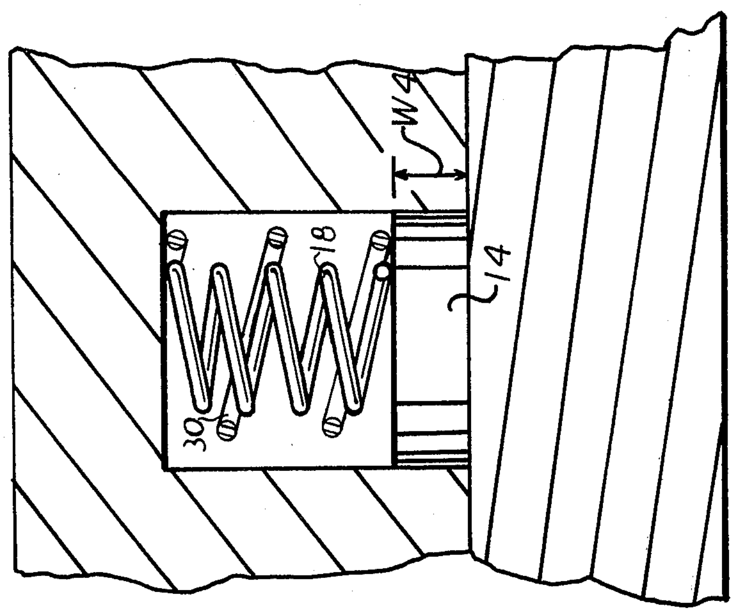
FIG. 4 comprises the same structure as FIG. 3, but shows the wear element after repeated cycles have produced wear and size reduction; and, FIG. 5 is a fragmentary side elevational view, partly in cross-section, of another embodiment of the present invention.

FIG. 3 illustrates a wear block 14 having a length W3, corresponding to zero cycles. The length W4 of block 14 in FIG. 4 denotes a decreased length due to subjecting the system to a plurality of cycles. Block 14 can be cut from a long length of rod of desired material, such as plastics, composites, steel alloys, or non-ferrous materials, so as to gauge the wear on a system or assembly of component elements having a predictable service life based upon cyclic movements. For artillery weapons, service life is based upon number of rounds fired, which is reflected by the number of recoil cycles occurring over the life of the weapon.

Figure 2:
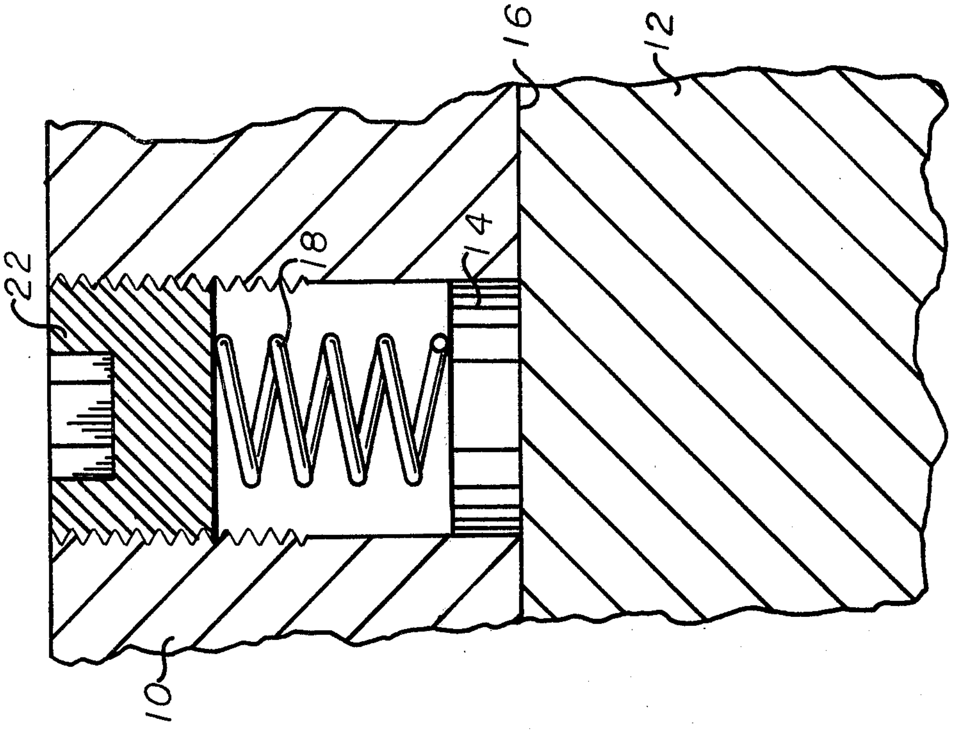
FIG. 2 is a fragmentory elevation partly in cross-section of the counter elements of FIG. 1.

The indicia depicted in FIGS. 1 and 2 are illustrative only. Obviously in a high speed engine, a low wear rate would be desirable for the wear block 18, whereas in a low use item, such as a weapon which requires servicing after a relatively low number of cycles, a high wear rate is desired.

The wear rate of the wear block 14 need not be significantly higher than that of the relatively moving elements 10 and 12, whose relative motion is being counted. Where necessary or helpful, however, the wear rate of block 14 can be substantially higher than the working surfaces of the parts whose wear is sought to be measured by use of the block. It should be noted that the purpose of the device is primarily to serve as an indication of relative wear between the movable elements 10 and 12 by counting the number of relative movements. Also, where sealing of the mechanism is of no concern, or can be conveniently achieved, means may be provided for indicating the wear of block 14 from the exterior of the system, as for example in FIG. 5. In addition, the erosion rate of block 14 may be increased by abrading or serrating its wear surface to induce higher rates of erosion.

Figure 5:
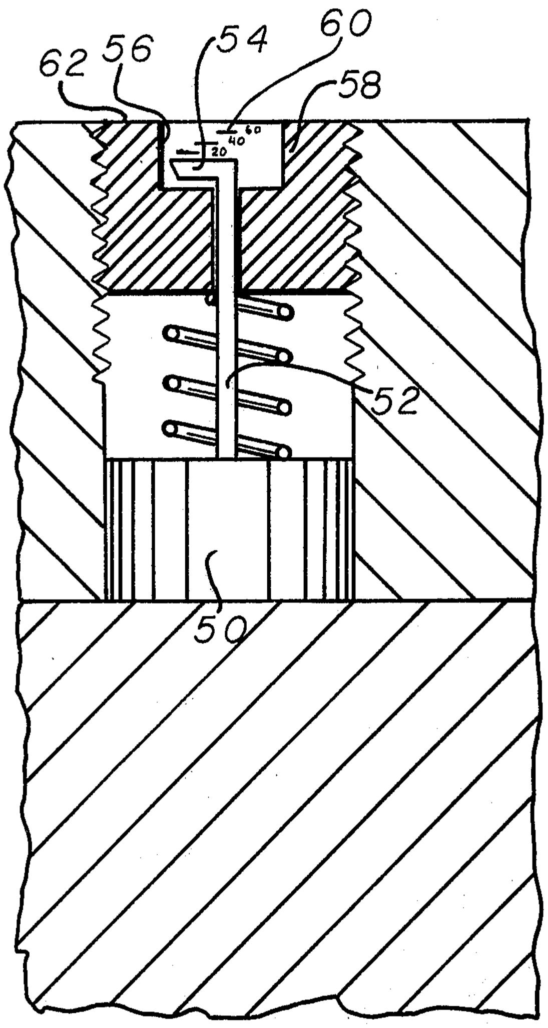

Referring to FIG. 5, the wear block 50 carries an extension rod 52 which can have a pointer element 54 which extends toward the interior surface 56 of the threaded screw element 58. The number of cycles can be counted by determining the position of the pointer 54 relative to indicia or markings 60 scribed on the interior surface of the screw element 58, or by noting the change in distance of the upper edge of the extension rod 52 from the top surface 62 of the screw 58 or by any other desired means. Alternatively, for example, the motion of the extension rod 52 may be used to rotate an arrow which is set against a graduated digital or analogue scale (not shown). Also, striated layers of block 14 may be color-coded to indicate numerical ranges of artillery round-count, such that various colored layers erode sequentially in turn.

The prime factor in the instant invention is that the counting device indicates the amount of wear in an assemblage of mechanical parts by counting its cyclic movements. This countage is done by use of a wear element, the wear rate of which is correlatable to the number of cyclic movements which produce such wear.

The wear block may even be harder than the material against which it rubs, although it should not be capable of adversely affecting the cooperating element, as for example by cutting a groove or slot.

It should be noted that the wear block and spring can be contained in a recess or passage drilled or otherwise formed in the first mechanism 10. Alternatively, a sleeve member can be press fit or otherwise retained in the first mechanism, and the cycle counter can be mounted in the sleeve member.

The foregoing disclosure and drawings are merely illustrative of the principles of this invention and are not to be interpreted in a limiting sense. I wish it to be understood that I do not desire to be limited to the exact details of construction shown and described because obvious modifications will occur to a person skilled in the art.

I claim:

1. A cycle counter for counting the number of repetitive movements of a first element relative to a second element, comprising:

a. a wear member, said wear member adapted to erode at a predetermined rate correlatable with the number of said repetitive movements, b. a first element having means for receiving said wear member and a spring biasing means for urging said wear member towards a second element, c. a second element mounted for repetitive moving relationship to said first element and having a surface in contact with a surface of said wear member, whereby the number of said repetitive movements can be determined by the amount of wear of said wear member.

2. The cycle counter of claim 1, wherein;

said spring biasing means applies a continuous force to said wear member during the entire period of erosion of said wear member.

3. The cycle counter of claim 1, further comprising;

indicia formed on said wear member for indicating the number of repetitive movements of said first element relative to said second element.

4. The structure set forth in claim 3, wherein;

said indicia comprises striated layers of various colors adapted to erode sequentially.

5. The cycle counter of claim 1, wherein;

said means for receiving said wear member and said spring biasing means is a passage through said first element, the wear member being positioned at a first end of said passage in contact with a surface of said second element, a passage closure means is positioned at the second end of said passage and said spring biasing means is positioned between said passage closure means and said wear member for urging said wear member toward said second element.

6. The cycle counter of claim 5, wherein;

said passage closure means threadedly engages said passage.

7. The cycle counter of claim 1, further comprising;

a sleeve member mounted in said first element, and wherein said cycle counter is mounted in said sleeve member.

* * * * *